June 29, 1937.  N. R. NORMAN  2,085,227
ADJUSTABLE BRACKET
Filed Dec. 29, 1934  2 Sheets-Sheet 1
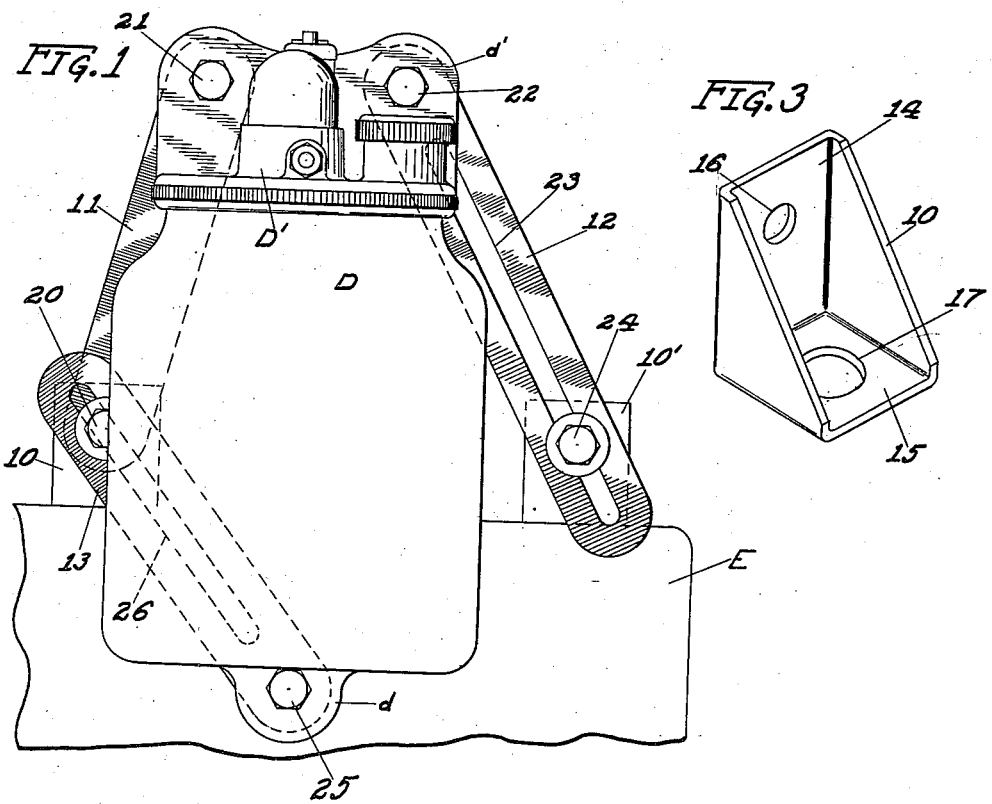
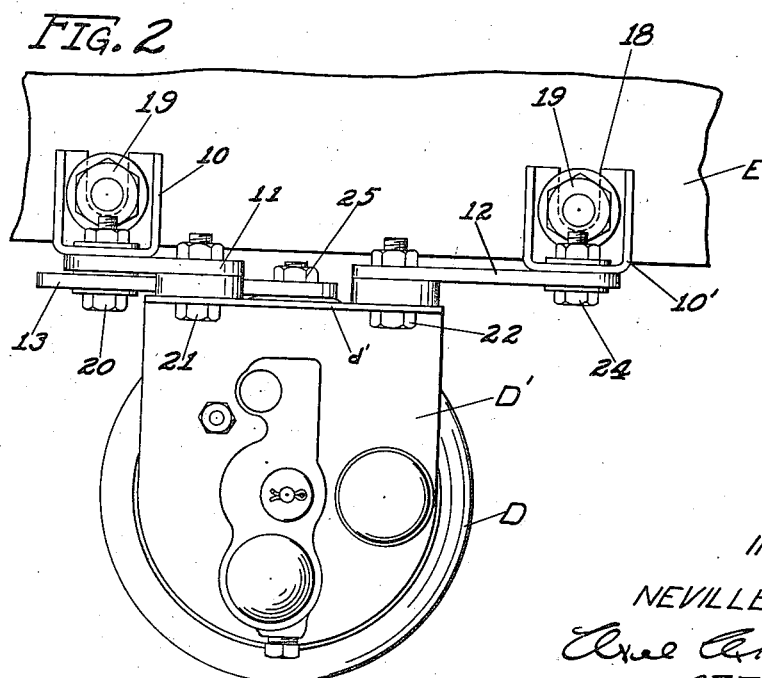
INVENTOR
NEVILLE R. NORMAN
ATTORNEY

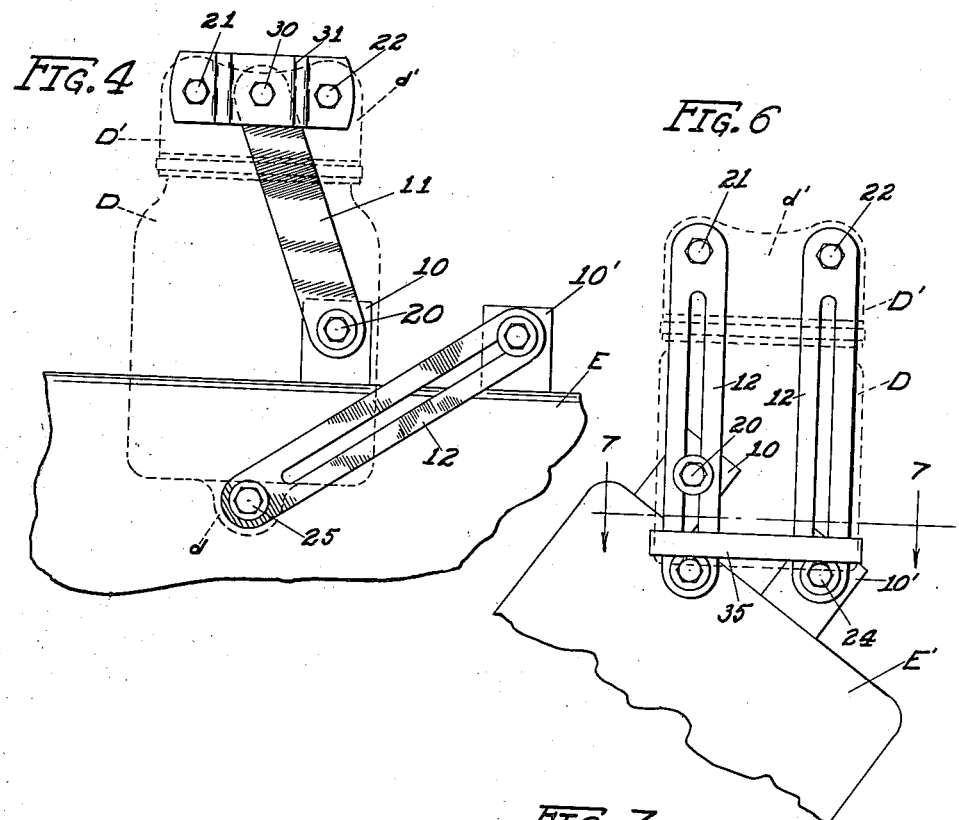
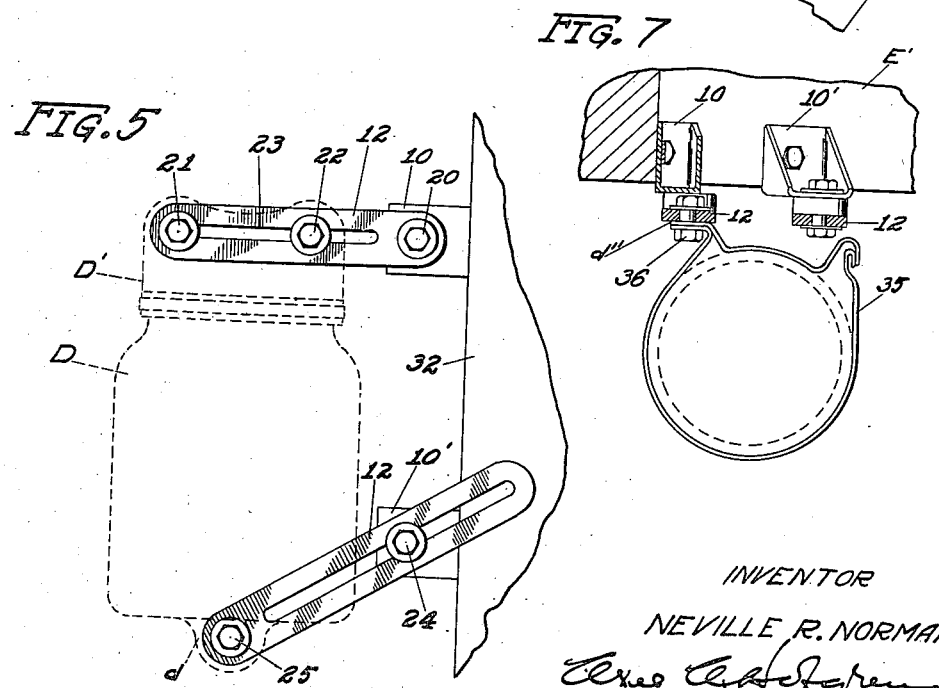

Patented June 29, 1937

2,085,227

UNITED STATES PATENT OFFICE 2,085,227

ADJUSTABLE BRACKET

Neville R. Norman, River Forest, Ill., assignor to Joseph Weidenhoff, Inc., Chicago, Ill., a corporation of Illinois Application December 29, 1934, Serial No. 759,702

8 Claims. (Cl. 248—312)

More particularly the invention relates to an adjustable bracket or supporting means for mounting an upper motor lubricator or other device on or adjacent the engine of a motor vehicle.

It is the general object of the invention to provide a new and improved adjustable bracket of simple construction which is readily adapted for supporting various types of devices either on the engine or the adjacent parts of a motor vehicle forming the engine compartment.

Another object is to provide a new and improved adjustable bracket which may be readily supported on vertical, horizontal or inclined surfaces for the purpose of securing a lubricator or other device in an upright position.

Another object is to provide such an adjustable bracket with attaching means adapted to be inserted beneath the nuts or heads of the cylinder head bolts of an engine so as to facilitate the installation of the bracket.

A further object is to provide an adjustable bracket suitable for supporting an upper motor lubricator or other device in any one of various makes of motor vehicles wherein the position of the available supporting surfaces and the spacing of attaching bolts vary considerably.

Other objects and advantages will become readily apparent from the following detailed description taken in connection with the accompanying drawings, in which Figure 1 is a fragmentary elevation illustrating a preferred form of the invention supporting an upper motor lubricator on the cylinder head of an engine.

Figure 2 is a plan view thereof.

Fig. 3 is an enlarged perspective view of an attaching member.

Fig. 4 is a fragmentary elevation illustrating an application of a modified form of the invention.

Fig. 5 is a fragmentary elevation illustrating the application of the invention to a vertical supporting member.

Fig. 6 is a fragmentary elevation illustrating the application of the invention to an inclined supporting member.

Fig. 7 is a horizontal section taken along the line 7—7 of Fig. 6.

Although I have illustrated in the drawings and shall hereinafter describe in detail various forms of the invention utilized for supporting an upper motor lubricator of the type disclosed in the Vernon J. Harris Patent No. 1,960,584, dated May 29, 1934, it is to be understood that I do not intend to limit the invention to the particular forms or arrangements shown but aim to cover all modifications and alternative constructions coming within the spirit of the appended claims. The invention is equally applicable for the supporting of other devices and auxiliary equipment.

As illustrated in Figs. 1 and 2, a preferred form of the invention is utilized for attaching an upper motor lubricator to the cylinder head E of an automotive engine. The lubricator in this instance comprises generally a cylindrical metal container D for the lubricant and a cover member D', the container having an attaching lug $d$ at its lower end and the cover member a lug $d'$ positioned substantially in the same vertical plane as the lug $d$. The lower lug $d$ has a single bolt receiving aperture whereas the upper lug $d'$ has a pair of laterally spaced bolt receiving apertures.

In the form shown in these figures, the invention comprises a pair of attaching members or angle brackets 10 and 10' and supporting bars 11, 12 and 13. The angle brackets are generally of the form illustrated in Fig. 3 and have attaching portions 14 and 15 positioned at right angles to each other which are provided with bolt receiving apertures 16 and 17 respectively, although if desired, the bolt opening in the portion 15 may be in the form of an open-ended slot 18 as shown in Fig. 2 so as to facilitate installation. These angle brackets may be secured in laterally spaced relation to the engine cylinder head by loosening two cylinder head bolts sufficiently to permit inserting the attaching portions 15 of the angle brackets under the heads thereof. These bolts may then be tightened to clamp the angle brackets.

The bar 11 is provided with an aperture at one end for receiving a clamping bolt 20 which extends through the upright portion of the angle bracket 10, and bar 11 is provided with an aperture at its other end for receiving a clamping bolt 21 which also extends through one of the bolt apertures in the lug $d'$. The bar 12 is provided with an aperture at its upper end for receiving a clamping bolt 22 which also extends through the other bolt receiving aperture of the lug $d'$, and this bar has an elongated bolt receiving aperture or slot 23 for receiving a clamping bolt 24 which also passes through the bolt receiving aperture of the upright portion of the angle bracket 10'. The bar 13 has a bolt receiving aperture at its lower end for receiving a clamping bolt 25 which passes through the bolt receiving aperture in the lug $d$, and bar 13 also has an elongated bolt receiving aperture or slot 26 for receiving the clamping bolt 20 on the angle bracket 10. With the bars straight, as shown, suitable spacing washers may be inserted between the upper ends of bars 11 and 12 and the lug d' (Fig. 2). It will be readily apparent that with this construction the invention is adapted for application to cylinder heads having different bolt spacings and that irrespective of the spacing of the cylinder head bolts, the lubricator may be maintained in an upright position not only by clamping the bars 11 and 12 in their properly adjusted positions, but also by means of the bar 13.

As illustrated in Fig. 4 a pair of angle brackets 10 and 10' are combined with a pair of bars 11 and 12 to support a lubricator D—D'. The bar 11 is secured at its lower end by means of the clamping bolt 20 of the angle bracket 10 and at its upper end is secured by means of a clamping bolt 30 to a strap 31 secured to the lug D' by means of the clamping bolts 21 and 22. Here again the slotted bar 12 permits installation of the invention on engines having different bolt spacings on the cylinder heads while maintaining the lubricator in an upright position.

As illustrated in Fig. 5 a pair of slotted bars 12 are combined with a pair of angle brackets 10 and 10' to mount a lubricator D—D' on a vertical support or wall 32. In this instance the upper bar 12 is positioned substantially horizontally so as to receive both of the clamping bolts 21 and 22 in the slot 23.

As illustrated in Figs. 6 and 7 a lubricator D—D' is supported in an upright position on the inclined cylinder head E' of a V-type engine. As shown, a pair of angle brackets 10 and 10' are secured on the same cylinder head although, if desired, the pivotal connection between the angle brackets and a pair of bars 12 would permit the angle brackets to be swung to any desired position. The upper end of the bars 12 are secured by the clamping bolts 21 and 22 to the upper lug d' whereas the slotted ends of the bars are secured to the angle brackets by means of the clamping bolts 20 and 24. In this application of the invention the container D is made of glass and has a metal band 35 secured around its lower end and provided with a lug extension d''. This lug is secured by means of a clamping bolt 36 to the lower end of the left hand bar 12 so as to form a more rigid support for the lubricator.

The invention is adapted for what might readily be termed "universal" use, since by utilizing a pair of angle brackets with two or three bars devices with many different spacings of attaching lugs may be supported on the many differently sized and positioned supporting surfaces found in the engine compartment of a motor vehicle.

I claim as my invention:

1. An adjustable bracket for supporting a device in upright position comprising, in combination, a pair of angle brackets adapted to be secured in laterally spaced relation to a support, a pair of bars each having a bolt receiving aperture in each end thereof, one aperture in one of the bars being in the form of an elongated slot extending longitudinally of the bar, a clamping bolt on each angle bracket extending through one aperture of a bar, and clamping bolts passing through the other apertures of the bars for securing the bars to a device supported by the bracket.

2. An adjustable bracket for supporting a device in upright position comprising, in combination, a pair of angle brackets adapted to be secured in laterally spaced relation to a support, a pair of bars each having a bolt receiving aperture in each end thereof, one aperture in one of the bars being in the form of an elongated slot extending longitudinally of the bar, a clamping bolt on each angle bracket extending through one aperture of a bar, clamping bolts passing through the other apertures of the bars for securing the bars to one end of a device supported by the bracket, and another bar having a bolt aperture in each end, one of which is in the form of an elongated slot extending longitudinally thereof, said last mentioned bar being adapted to connect one of said angle brackets adjustably to the other end of the device supported by the bracket.

3. An adjustable bracket for supporting a device in upright position comprising, in combination, a pair of right angle brackets adapted to be secured in laterally spaced relation to a support, a pair of bars, means securing one end of one bar pivotally to one of said angle brackets, means securing one end of the other bar adjustably to the other of said angle brackets, and means for securing the other ends of said bars to the device supported by the bracket.

4. An adjustable bracket for supporting, in upright position, a device having a first mounting lug adjacent its upper end and a second mounting lug adjacent its lower end comprising, in combination, a pair of angle brackets adapted to be secured in laterally spaced relation under the heads of two bolts, a first bar extending between one of said brackets and the upper end of said device, a second bar extending between the other of said brackets and the lower end of said device, means for securing said bars to said device, means for securing said bars adjustably to said brackets, and a third bar secured to the upper end of said device and to the angle bracket to which said second bar is secured.

5. A bracket for supporting in upright position a device having a first mounting lug adjacent its upper end and a second mounting lug adjacent its lower end comprising, in combination, a pair of angle brackets adapted to be secured in laterally spaced relation, a first bar extending between one of said brackets and the upper end of said device, a second bar extending between the other of said brackets and the lower end of said device, means for securing said bars to said device, means for securing said bars to said brackets, and a third bar secured to the upper end of said device and to the angle bracket to which said second bar is secured.

6. An adjustable bracket for supporting in upright position a device having a first mounting lug adjacent its upper end and a second mounting lug adjacent its lower end comprising, in combination, a pair of angle brackets adapted to be secured in laterally spaced relation, a first bar pivotally secured at one end to one of said angle brackets and pivotally secured at the other end to the lug at the upper end of said device, and a second bar pivotally secured at one end to the lug adjacent the lower end of the device and adjustably secured to the other of said angle brackets.

7. A bracket for supporting, in upright position, a device having a first mounting lug adjacent its upper end and a second mounting lug adjacent its lower end comprising, in combination, a pair of attaching angle brackets adapted to be secured in laterally spaced relation, means connecting the upper one of the lugs with one of said attaching angle brackets and means connecting the lower one of said lugs with the other of said attaching angle brackets.

8. An adjustable bracket for supporting in upright position a device having a first mounting lug adjacent its upper end with laterally spaced bolt-receiving apertures and a second mounting lug adjacent its lower end comprising, in combination, a pair of attaching members adapted to be secured in laterally spaced relation on a support, a first bar having an aperture at one end for pivotal connection of the bar to one of said attaching members and an elongated slot extending longitudinally thereof longer than the distance between the bolt-receiving apertures in the upper mounting lug, a clamping bolt extending through each of the bolt receiving apertures in the upper lug and through the elongated slot for attaching said bar to the device to be supported, and a second bar connected between the other attaching member and the lower lug on the device.

NEVILLE R. NORMAN.